United States Patent [19]

Bernstein

[11] Patent Number: 4,458,142

[45] Date of Patent: Jul. 3, 1984

[54] PROGRAMMED ELECTRONIC KEYCORDER UNIT

[75] Inventor: Marvin Bernstein, Asbury Park, N.J.

[73] Assignee: Hecon Corporation, Tinton Falls, N.J.

[21] Appl. No.: 371,140

[22] Filed: Apr. 23, 1982

[30] Foreign Application Priority Data

Oct. 7, 1981 [GB] United Kingdom ............... 8130276

[51] Int. Cl.$^3$ ............................................. B41F 33/02
[52] U.S. Cl. .................................. 235/381; 235/375; 377/38; 340/825.35
[58] Field of Search ..................... 235/380, 381, 382.5, 235/487; 377/2, 15, 16, 38; 194/DIG. 10; 340/825.35, 825.36

[56] References Cited

U.S. PATENT DOCUMENTS

| | | | |
|---|---|---|---|
| 3,684,870 | 8/1972 | Nelson | 377/16 |
| 3,872,282 | 3/1975 | Long | 377/38 |
| 3,921,875 | 11/1975 | Hengstler et al. | 377/38 |
| 4,120,452 | 10/1978 | Kimura et al. | 235/381 |
| 4,168,533 | 9/1979 | Schwartz | 364/900 |
| 4,179,064 | 12/1979 | Yoshioka et al. | 235/381 |
| 4,204,113 | 5/1980 | Giraud et al. | 235/375 |
| 4,263,583 | 4/1981 | Wyckoff | 377/16 |
| 4,367,402 | 1/1983 | Giraud et al. | 235/385 |

FOREIGN PATENT DOCUMENTS 2013567 8/1979 United Kingdom .

OTHER PUBLICATIONS

Brochure of Datakey Support System–8 pages, by Datakey Inc., 12281 Nicollet Ave, Burnsville, MN 55337.

*Primary Examiner*—Harold I. Pitts
*Assistant Examiner*—Robert Lev
*Attorney, Agent, or Firm*—Louis Weinstein

[57] ABSTRACT

A miniaturized card unit, resembling a standard credit card, incorporates solid state counter, a multiplexer means, and a small battery. The counter may be incremented or decremented in accordance with a direction control signal. A multiplexer in the card unit is releasably engageable with the demultiplexer provided in a card reader unit. Control signals, simultaneously applied to the multiplexer and demultiplexer transfer the count stored in the card unit to decoder driver circuits which drive a display for visually displaying the decimal count stored in the card. A logical circuit monitors selected segments of the display to enable operation of the device controlled by the card reader unit so long as the card inserted therein contains a non-zero count. The logical circuit prevents operation of the device upon the occurrence of a zero count as well as the absence of a card unit. A relatively low frequency clock is utilized to control the illumination of the card reader display as well as the generation of the multiplexing signals. Signals representative of the device usage are applied to the card unit counter for decrementing the count. A new count is introduced into the card unit by insertion into a card programmer unit having settable thumbwheel switches for setting a down counter. The presence of a card unit and the closure of a program switch causes simultaneous incrementing of the card unit counter and decrementing of the card program counter. When the card programmer unit counter is decremented to zero, incrementing of the card unit counter is automatically terminated. The card programmer unit display visually displays the count in the card unit counter confirming that the desired count has been placed in the card unit, said display incorporating demultiplexer, driver and control circuits similar to those provided in the card reader unit. The use of cascaded gating means prevents false count pulses from being transferred to the card unit counter when the end count is reached.

26 Claims, 5 Drawing Figures

PROGRAMMED ELECTRONIC KEYCORDER UNIT

FIELD OF THE INVENTION

The present invention relates to control devices and, more particularly, to a control device for limiting access to a machine or other equipment or device to authorized personnel possessing a card unit which further contains stored data controlling the extent of access to the machine permitted to the holder of the card unit.

BACKGROUND OF THE INVENTION

A number of applications exist wherein it is desirable to limit access to machines to only those persons having proper authorization and further to limit the extent of such access. As one example, it is sometimes desirable to limit the use of copier machines to selected personnel. The copier machine is often provided with a substantially tamper proof counter for maintaining a cumulative count of the number of copies which have been produced to date. One standard technique for authorizing use of the copier machine is to provide selected personnel with a conventional key arranged to release a cooperating mechanical lock which, when opened, may be arranged to provide for the completion of an electrical circuit to provide power to the machine. Since keys of this type may be simply, readily and inexpensively reproduced, one standard prior art approach to avoid simple reproduction of keys is described in U.S. Pat. No. 3,436,530, issued Apr. 1, 1969 and assigned to the assignee of the present application, and which discloses a control unit forming a part of the copier machine and arranged to releaseably receive a portable plug-in unit containing an electromechanical counter and an electrical or electronic circuit element or elements which, when the portable unit is plugged into the control unit, serve to operate a relay which couples the machine to a local power source. The control unit is also preferably provided with an electromechanical counter.

The machine or device whose access is being controlled generates pulses representative of machine usage. In the copier machine example, each pulse preferably represents the reproduction of a single copy. Each pulse is simultaneously applied to the electromagnetic counters of the portable, plug-in unit and the control unit. Ideally, the counter of the control unit should contain a count equal to the grand total of the individual counts in each of the portable plug-in units used in conjunction with that copier machine.

The above mentioned accountability system, although reasonably satisfactory for cost allocation purposes, fails to provide any means for limiting the extent of access which any authorized holder of a portable, plug-in unit.

This limitation led to the development of the system described in U.S. Pat. No. 3,921,875, issued Nov. 25, 1975 to the assignee of the present application. The apparatus described in the last mentioned patent also comprises a control unit forming part of the machine and a portable, plug-in unit. The portable unit contains an electromechanical counter which may be preset to any desired count from 0 to a count of up to 99999, for example. The portable unit is also provided with an electrical circuit for operating a relay to couple the machine whose usage is being regulated to a local power source. Pulses generated by the machine and representative of machine usage are applied to the electromagnetic counter of the control unit and to the electromagnetic counter of the portable unit to respectively increment the control unit counter and decrement the portable unit counter. When the count in the portable unit counter has been decremented to a predetermined value (preferably 0) a switch is opened to deenergize the aforementioned relay and thereby decouple the machine from its source of power.

The count in the electromechanical counter of the plug-in unit may be reset by opening the plug-in unit through the use of a mechanical key. Alternatively, the count may be advanced through the use of a pulsing device which applies the number of pulses to the electromechanical counter equal to the desired count to be stored therein. This is a sluggish and tedious operation due to the electromechanical nature of the counter which is further subject to wearing over a period of continuous use. The portable plug-in units and control unit are also unnecessarily large and subject to wearing and breakdown due to the large number of mechanical moving parts utilized in these units.

In addition to the above disadvantages, the portable unit housing may be broken into rather easily and the electromagnetic counter mechanism may easily be tampered with to create a non-zero count condition, thereby destroying system security. The electromechanical nature of the device also lends itself readily to evaluation of the contents to further aid unauthorized personnel in their quest to defeat the security measures and thereby permit unauthorized use of the machine or device being protected against unauthorized use.

BRIEF DESCRIPTION OF THE INVENTION

The present invention avoids all of the disadvantages of prior art systems and is characterized by comprising three basic subassemblies, each utilizing solid state circuits to totally avoid the disadvantages of large size and weight and wearing of components normally encountered in the prior art devices, such as those described, for example, in the above mentioned U.S. patents, and which present invention yields additional advantageous features as will be more fully described.

The three basic units employed in the solid state system of the present invention are a card unit, card reader unit and card programmer unit. The card unit is comprised of miniaturized solid state circuitry including an up/down counter, a multiplexer and a battery, all of which are arranged within a housing whose overall dimensions are of the order of a conventional credit card.

The card programming unit is substantially comprised of all solid state components including a display and driver circuit. When a card unit is inserted into the card programmer unit, a control circuit sequentially transfers the count in the card unit counter through the card unit mulitplexer and the card programmer unit demultiplexer to a driver circuit for displaying the contents of the card unit counter.

The count desired to be added to the card unit is set into manually settable switches.

Depression of a program start button in the presence of a card unit sets the count of the settable switches into the card programmer unit counter and enables a normally disabled clock in the card programmer unit counter. Pulses from the local oscillator increment the count of the card unit counter and simultaneously decrement the count of the card programmer counter.

Logical gates, which continuously monitor the card programmer counter, deactivate the local oscillator and simultaneously disable a previously enabled gate preventing spurious oscillator pulses from reaching the card unit counter. The card programmer display displays the count in the card unit counter to provide positive confirmation that the correct count has been added to the card unit, as well as displaying the count in the card unit prior to and during insertion of the desired count.

A card reader unit, which is interconnected with the machine whose use and extent of use is to be controlled, is provided with solid state decoder drivers for driving a visual display.

A control unit controls the card unit multiplexer in synchronism with a card reader unit solid state demultiplexer for sequentially transferring the count in the card unit counter to the decoder driver circuit.

The card reader unit further incorporates a local oscillator which operates the control unit for operating the multiplexer and demultiplexer circuits in synchronism and provides time division pulses to the visual display.

The display driver circuits convert the data transferred thereto from the card unit counter into signals appropriate for illuminating the display device which is preferably of the seven segment LCD (liquid crystal display) type. Selected ones of the signals of each decimal digit position of the display are coupled with logical gating circuitry which operates to energize a relay for providing a machine enabling signal and for deenergizing a relay to disable the machine when the count in the card unit counter is decremented to zero by pulses derived from the machine, which zero count is also displayed by the card reader unit display.

Pulses representative of machine usage are applied to the card unit counter through the card reader unit to decrement the contents of the card reader unit counter upon the occurrence of each count pulse.

The simplified, miniaturized, solid state design eliminates the need for a card reader unit display and its attendant cost and weight, reducing the card reader unit, for example to a weight of no greater than one ounce, as compared with key counter units which, in addition to being relatively large and bulky, are more than five times the weight of the card unit.

The solid-state multiplexer and demultiplexer units significantly reduce the electrical connections required between the card programmer unit and the card unit and between the card reader unit and the card unit. The small battery employed in the card unit is capable of a significantly long, useful operating life due to the elimination of a display in the card unit and the provision of single, visual display means in only the card reader and card programming units, yielding a significant reduction in cost and which is a direct function of the number of card units employed within a single system. As an alternative arrangement, the card unit may employ a rechargeable battery which is designed to be recharged either during the time that the card unit is being programmed to receive a new count or at the time the card unit is inserted into a card reader unit.

The system enhances centralized control or, alternatively, provides a prepayment capability.

The system employs extremely low power solid state integrated circuits as well as display devices which consume almost no power since they operate with low conductivity electro-statics and thereby consume significantly less power than prior art devices presently in use.

The circuit connections required to be made to the card reader unit serve as additional security means since specific knowledge of the machine construction would be required to have any reasonable chance of making the required connections.

OBJECTS OF THE INVENTION AND BRIEF DESCRIPTION OF THE FIGURES

It is therefore one object of the present invention to provide a novel, highly simplified solid state control system for controlling access to a machine and the extent of such access by means of a preprogrammed card unit having a solid state counter selectively engageable with a card reader unit for displaying the present count in the card reader unit, for decrementing the count responsive to machine usage and for locking the machine against further usage when the count in the card unit reaches a predetermined count.

Another object of the present invention is to provide a control system of the type described in which solid state programming means is provided for simply, rapidly and accurately entering a preprogrammed count into the solid state counter of a card unit and including display means for displaying the contents of the card unit counter to confirm entry of the preprogrammed count.

Still another object of the present invention is to provide a control system of the type described in which system security is obtained through the provision of a card identity code which is examined by a key acceptor unit for validity in order to enable the device being controlled.

The above, as well as other objects of the present invention, will become apparent when reading the accompanying description and drawing in which:

FIG. 4b shows a sectional view of the card unit of FIG. 4a and an end view of the card unit of FIG. 1a.

DETAILED DESCRIPTION OF THE INVENTION

Figures 1, 1A:
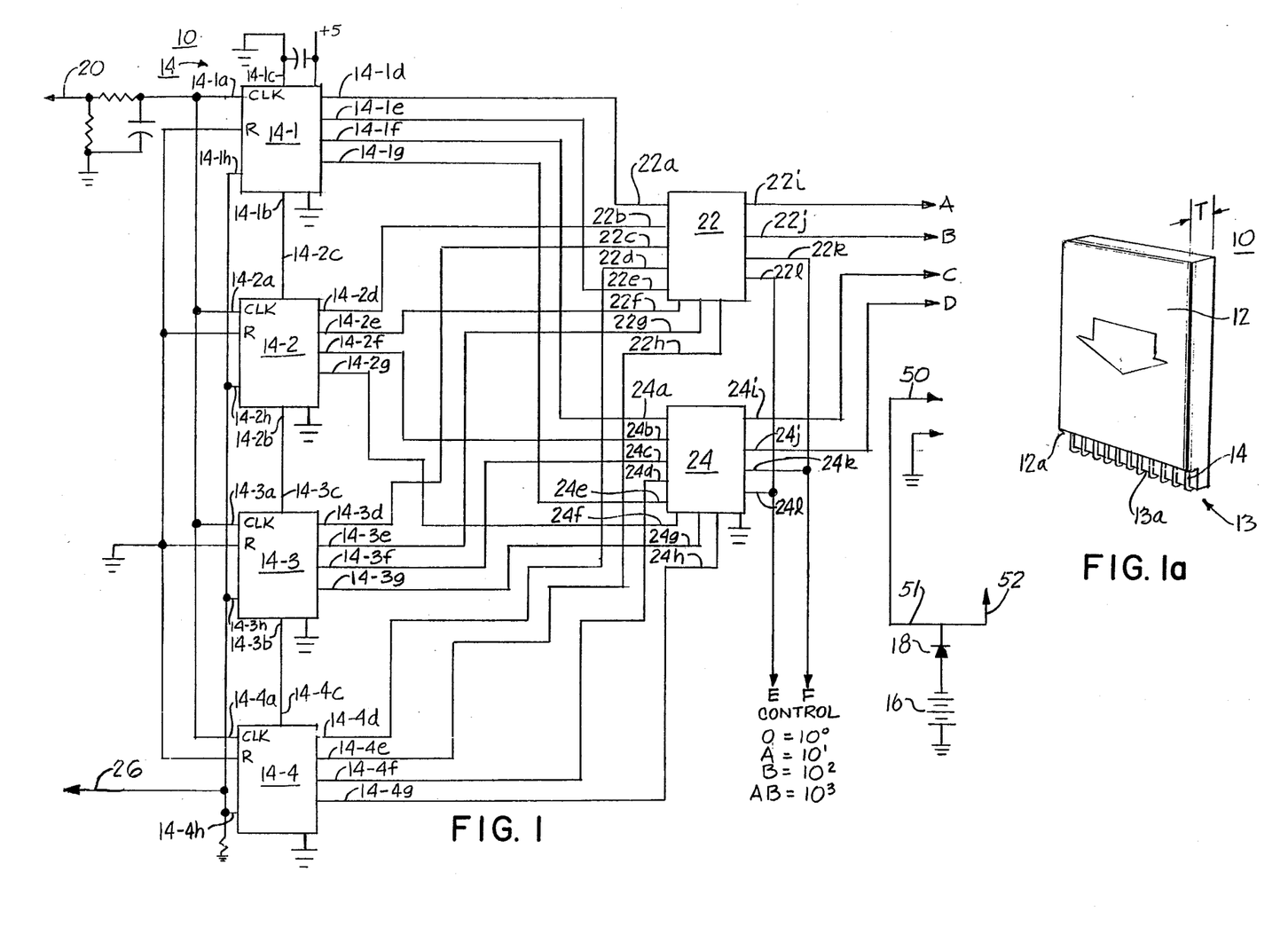
FIG. 1 is a schematic diagram of a card reader unit embodying the principals of the present invention.
FIG. 1a shows a perspective view of the card unit exterior.

One preferred embodiment of the card unit 10 of the present invention is shown in FIGS. 1 and 1a, FIG. 1a showing the outward physical appearance thereof, wherein it can be seen that the card unit 10 comprises a thin, rectangular shaped body 12, preferably formed of plastic, and containing solid state circuits (to be more fully described) embedded therein. The body 12 generally resembles a conventional credit card but has a slightly greater thickness T. One end 12a, of a reduced thickness portion is provided with an edge connector assembly 13 for insertion into an edge connector socket to be more fully described, said socket 13 including individual end terminals 13a.

The card unit 10 comprises a solid state counter 14 of the binary coded decimal type which, in the preferred embodiment of FIG. 1 is further comprised of four CMOS type 4510 integrated circuits or stages 14-1 through 14-4 electrically connected to form an up/-down counter 14, each stage capable of storing a decimal number in binary form. A battery 16 powers the counter 14. Battery 16 is shown schematically but may, for example, be comprised of a pair of 1.5 volt watch batteries of the type 393BP, and being connected in series. Diode 18 serves as a blocking circuit device to prevent charging of battery 16 by external connections.

Each counter stage 14-1 through 14-4 has its clock input 14-1a through 14-4a connected in common to a count input terminal 20. The carry outputs 14-1b through 14-3b of stages 14-1 through 14-3 are electrically connected to the carry inputs 14-2c through 14-4c of counter stages 14-2 through 14-4.

The binary coded decimal output terminals 14-1d through 14-1g and 14-4d through 14-4g are selectively connected to respective inputs 22a through 22h and 24a through 24h of solid state multiplexer circuits 22 and 24 which are preferably type 4052 integrated circuits which multiplex (i.e. sequentially transfer) the digital data stored in counter 14 to the output terminals 22i and 22j of circuit 22 and 24i and 24j of circuit 24. The multiplexed data output terminals are labelled A, B, C and D respectively. Input lines labelled E and F are adapted to apply binary type control signals derived from an external source 30 or 90 to the control terminals 22k and 22l of circuit 22 and 24k and 24l of circuit 24 to control the multiplexing and demultiplexing operation as will be more fully described.

Control inputs 14-1h through 14-4h of the counter stages comprising counter 14 are connected in common to a terminal 26 arranged to be electrically connected with either the card reader unit 30 (FIG. 2) or the card programmer unit 90 (FIG. 3) and to receive a binary level signal from the card reader unit 90 causing the counter to be decremented when count pulses are applied to terminal 20 and alternatively arranged to receive an opposite level binary signal causing counter 14 to be incremented when count pulses are applied to input 20 by the card programming unit 30, which operations will be more fully described hereinbelow.

The embodiment of the card unit 10 shown in FIG. 1 is thus capable of storing any count from 0000 through 9999. Obviously, the count capacity may be increased by adding one or more additional counter stages, if desired.

Figure 2:
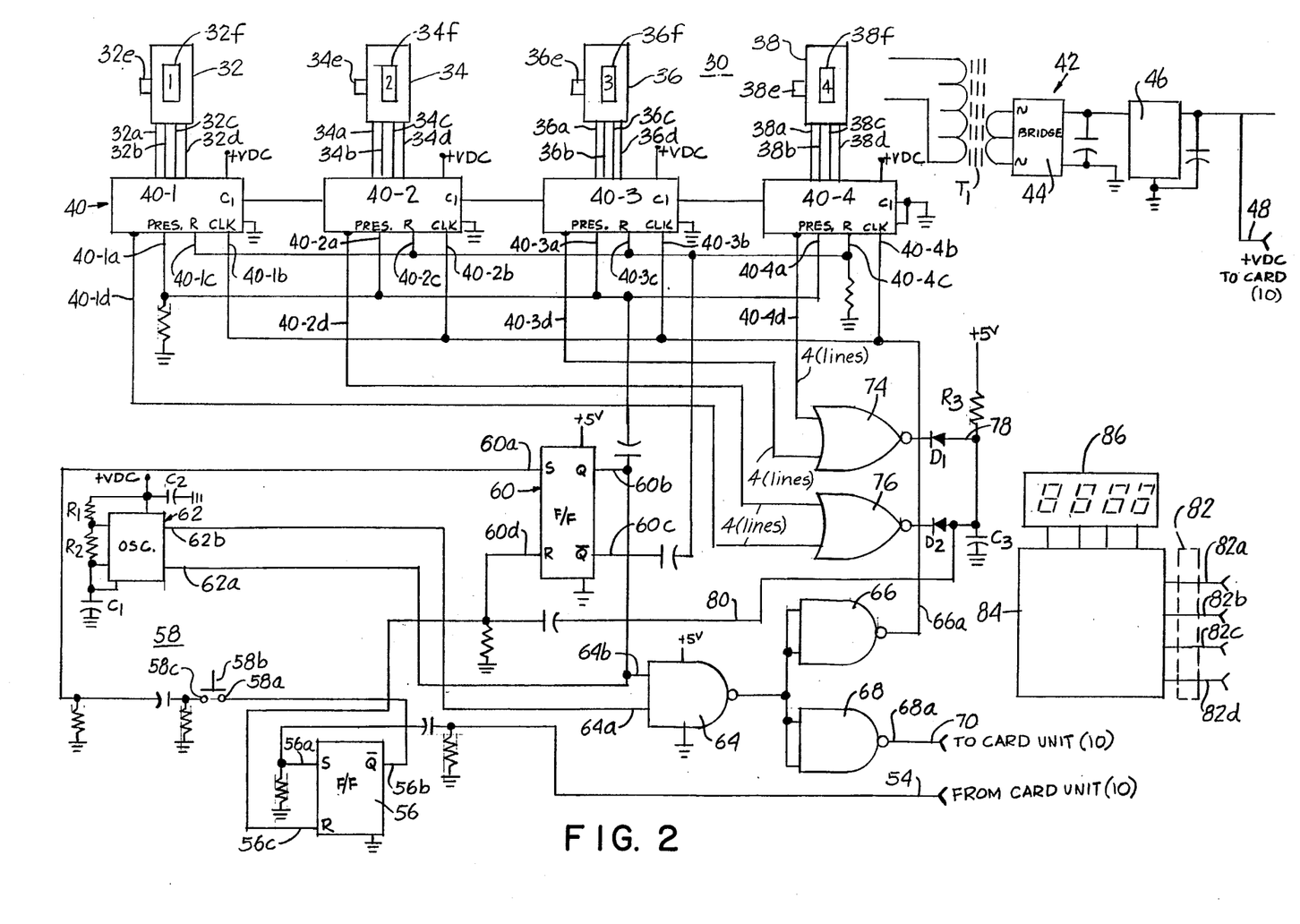
FIG. 2 is a schematic diagram showing the solid state card programmer employed for introducing a preprogrammed count into a card unit of the type shown in FIG. 1.

The card programmer unit 30, as shown in FIG. 2, functions to generate an exact number of pulses equal to the count desired to be added to a card unit 10 inserted into the card programmer unit 30.

This is accomplished by means of thumbwheel switches 32 through 38 each having their binary coded outputs electrically connected to associated inputs of a counter 40 (comprised of solid state counter stages 40-1 through 40-4) which are preferably type 4510 counter stages arranged to operate as a decrementing counter.

A local power supply 42 provided in card programmer unit 30 converts a 115 VAC source through transformer T1 and full-wave bridge 44 to a DC signal. A type 7805 circuit 46 provides a stabilized +5 VDC output which is coupled through terminal 48 forming part of a card programmer unit receptacle to terminal 50 forming part of the edge connector 12a of card unit 10 (shown in FIG. 1). Terminal 52 of card unit 10 is, in turn, coupled to terminal 54 of card programmer unit 30, shown in FIG. 2. Thus, when a card unit 10 is inserted into the connector forming part of the card programmer unit 30, an electrical circuit is completed from the +5 V terminal 48 to terminal 50 of the card unit 10 and back to the card programmer unit 30 through lead 51 and terminal 54, which voltage is applied to the set input 56a of bistable flip-flop 56, causing its $\overline{Q}$ output 56b to go high. This voltage appears at terminal 58a of programming switch 58 and, when switch button 58b is pressed, completes an electrical circuit to stationary terminal 58c to apply a high signal to the set input 60a of bistable flip-flop 60 causing its Q output 60b to go high and causing its $\overline{Q}$ output 60c to go low.

The Q output of bistable flip-flop 60 is simultaneously applied to each preset input 40-1a through 40-4a of the counter stages of counter 40 causing the binary values, established by the settings of thumbwheel switches 32–38, to be preset into a respective one of the counter stages 40-1 through 40-4. Thumbwheel switches 32 through 38 are of a conventional type in which, by operation of a control knob such as control knob 32e, any number from decimal "zero" through decimal "nine" may be set within window 32f thereby providing a four bit binary output which is coupled to the input of the associated counter stage.

The Q output of bistable flip-flop 60 is further simultaneously applied to the reset terminal 62a of a type 555 timer which, by appropriate selection of the resistance values of resistors R1 and R2, and the capacitance values of capacitors C1 and C2, is operated as an oscillator which, in the present application, generates pulses at a rate of the order of 2 kHz at its output terminal 62b. The output 62b of oscillator 62 is coupled to input 64a of NAND gate 64 whose input 64b is also coupled to the Q output 60b of bistable flip-flop 60. The $\overline{Q}$ output of flip-flop 60 removes the reset level from inputs 40-1c through 40-4c of counter 40 enabling counter 40 to be preset.

The Q output of bistable flip-flop 60 also enables NAND gate 64 to pass clock pulses from clock source 62. These pulses are simultaneously gated through NAND gates 66 and 68 which are wired to operate as inverters. Output 66a of NAND gate 66 is coupled in common to the clock inputs 40-1b through 40-4b of the counter stages of counter 40, which counter is operated as a decrementing counter whose count is reduced from the setting preset into the counter 40 by thumbwheel switches 32 through 38, toward a zero count.

Output 68a of NAND gate 68 is coupled through terminal 70 of card programmer unit 30 to terminal 20 of card unit 10 shown in FIG. 1 causing the count in counter 14 to be incremented simultaneously with the decrementing of the count in counter 40.

Assuming that the counter 40 of card programmer unit 30 has been preset to introduce a decimal count of 1000 into the card unit counter 14, after clock source 62 has applied 1000 pulses to card unit counter 14 and to card programmer unit counter 40, all four counter stages 40-1 through 40-4 will have been decremented to zero. A pair of eight-input NOR gates 74 and 76 have respective ones of their inputs electrically connected to respective ones of the binary coded outputs of counter stages 40-1 through 40-4. Gate 74 has its eight inputs respectively coupled to four outputs of stage 40-4 and stage 40-3, while gate 76 has its eight inputs respectively coupled to the four binary coded outputs of stages 40-2 and 40-1, respectively.

Diodes D1 and D2 electrically connect the outputs of gates 74 and 76 to common terminal 78 arranged between resistor R3 and capacitor C3.

When all sixteen outputs of counter stages 40-1 through 40-4 are low, representing the decimal number 0000, the outputs of both gates 74 and 76 go high raising common terminal 78 to the +5 V level, which level is simultaneously applied through conductor 80 to reset inputs 56c and 60d of bistable flip-flops 56 and 60, respectively. The Q output of bistable flip-flop 60 simultaneously disables gate 64 and terminates the operation of clock source 62 preventing any noise from inadvertently pulsing the card unit counter 14 and thereby adding a false count to the card unit. The $\overline{Q}$ output of flip-flop 60 goes high preventing counter 40 from being accidentally preset. The resetting of bistable flip-flop 56 causes its Q output to go low preventing the programming operation from being repeated in the event that program button 58 is accidentally operated before the card unit 10 which has just had a preprogrammed count added to it, has been removed from the card unit receptacle forming part of card programmer unit 30.

The card programmer unit 30 is further provided with a solid state demultiplexer and control circuit 82, a display driver circuit 84 and a four digit display 86 which are substantially identical to like circuits provided within card reader unit 90 (to be more fully described hereinbelow). The inputs 82a through 82d of demultiplexer 82 receive the A through D outputs of multiplexers 22 and 24 provided in card unit 10. The demultiplexer and control circuitry 82 transfers the binary coded count stored in the stages of card unit counter 14 through multiplexer circuits 22 and 24 and demultiplexer 82 to the display driver circuitry 84 for illuminating display 86, which is preferably provided with four decimal display units, each being of the seven segment decimal type. A detailed description of the transfer of data from the card unit counter 14 to the card reader unit visual display 86 will be set forth in detail hereinbelow, it being understood that the operation of the same circuitry within the card programmer unit 30 is substantially identical to that provided in card reader unit 90.

Card programmer unit 30 thus makes it possible to enter an exact preprogrammed count into the card unit counter 14 in a simple, rapid manner, the entire operation taking, at most, a few seconds including set up, insertion and removal of the card unit 10. The display 86 provided within the card programmer unit 30 provides direct visual confirmation that the preprogrammed number has been correctly introduced into the card unit 10. The display 86 also serves as a means to ascertain the count within the card unit 10 before initiating a programming operation and further enables a preprogrammed count to be added to a card unit counter 14 which has other than a zero count when first introduced into the card programming unit 30.

Figure 3:
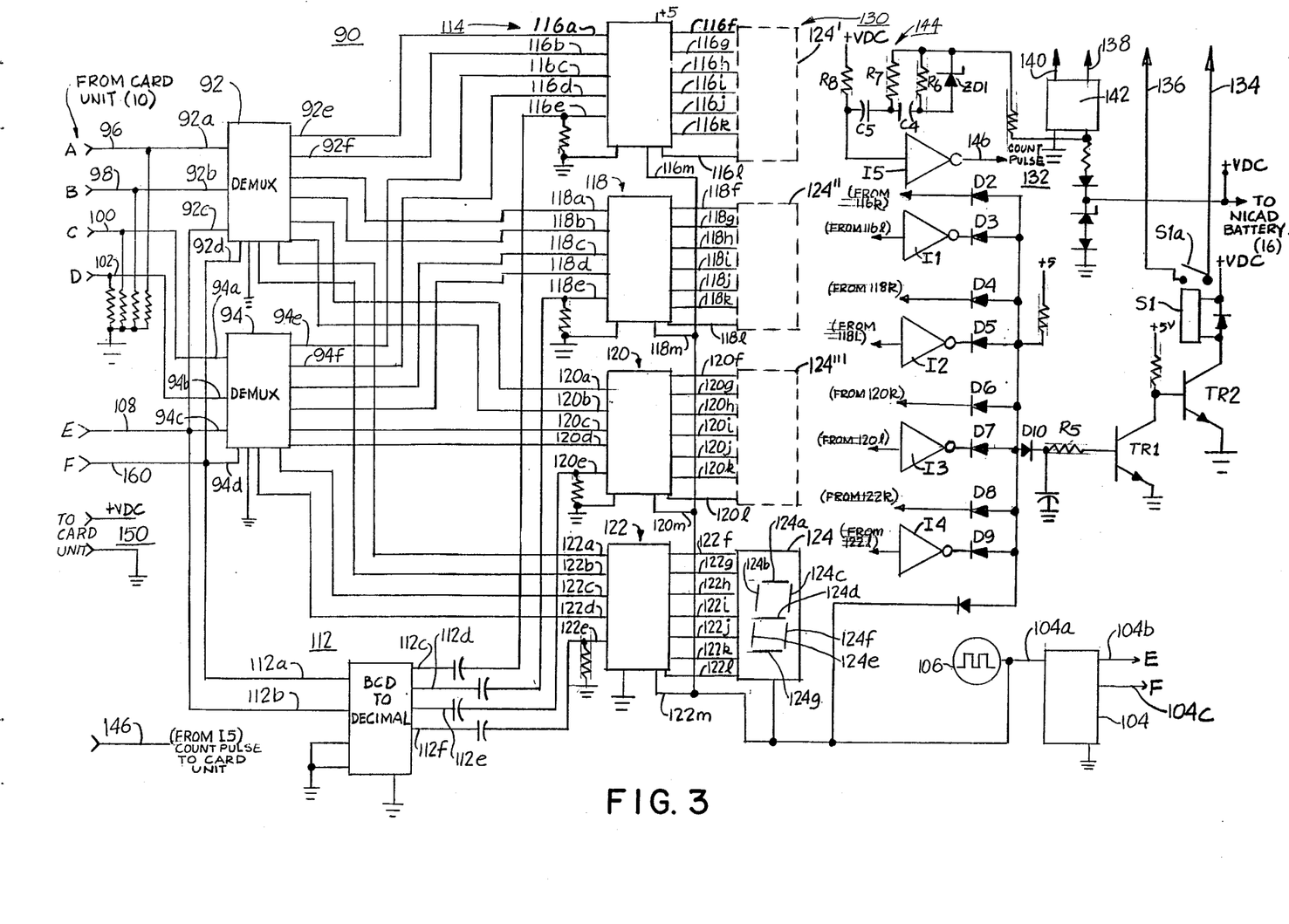
FIG. 3 is a schematic diagram of a card reader unit arranged for selective insertion of a card unit of the type shown in FIG. 1 for controlling the access and extent of access of a machine coupled thereto.

The card reader unit 90, shown in detail in FIG. 3, performs the functions of: displaying the four digit decimal number contained within the memory of the card unit 10 inserted into the card reader unit receptacle and enabling the machine being controlled by the card reader unit 90 when the count in the card unit 10 is other than zero. However, when the count in the card unit 10 reaches zero, the card reader unit 90 causes the machine to be made inoperative.

Card reader unit 90 recovers the count in card reader unit 10 by demultiplexing the binary coded information on the four lines labelled A through D which are respectively coupled to solid state demultiplexer circuits 92 and 94 which are preferably type 4052 integrated circuits. Input terminals 96 and 98, receiving data bits A and B, are coupled to inputs 92a and 92b of demultiplexer circuit 92 while terminals 100, 102 couple data bits C and D to inputs 94a and 94b of demultiplexer circuit 94.

Control signals for controlling the transfer of the count from card unit 10 to the card reader unit 90 are derived from solid state circuit 104 which is preferably a type 4029 circuit having a clock input 104a coupled to the output of a 100 Hz oscillator 106 for developing binary coded decimal control signals E and F at the outputs 104b and 104c, respectively.

The E and F signals are applied: through terminals 108 and 110 to the control inputs 22k, 22l and 24k, 24l of multiplexer circuits 22 and 24 in card unit 10 (shown in FIG. 1); and are simultaneously applied to the control inputs 92c, 92d and 94c, 94d of demultiplexer circuits 92 and 94; and to the inputs 112a and 112b of a binary coded decimal to decimal decoder circuit 112 which is preferably a type 4028 solid state circuit arranged to convert a two bit binary coded input into a radix four ("one of four") output.

Each of the multiplexers 22 and 24 of card unit 10 has four pairs of input terminals for a total of eight input terminals 22a through 22h and 24a through 24h. The binary coded multiplexer control signals E and F are simultaneously applied to the aforementioned control inputs of multiplexers 22 and 24 to cause only one pair of the four pair of input signals to appear at output terminals 22i, 22j and 24i, 24j of the multiplexer units 22 and 24, in accordance with the binary code applied to the control inputs 22k, 22l and 24k, 24l. For example, when control signals EF develop a binary code 0,0, the binary levels at outputs 22i and 22j are respectively coupled to inputs 22a and 22b, while the binary levels at outputs 24i and 24j are respectively coupled to inputs 24a and 24b causing the four binary bits representing the least significant decimal position, stored in counter stage 14-1, to appear at data output terminals A through D respectively.

Simultaneously therewith, control signals E and F control the demultiplexer circuits 92 and 94 so that the input signals appearing at 92a, 92b are transferred to outputs 92e and 92f and so that the inputs 94a and 94b are transferred to outputs 94e and 94f. These output pairs 92e–92f and 94e–94f are respectively coupled to inputs 116a through 116d of latched decoder driver circuit 116 forming part of the driver array 114 which further includes latched decoder driver circuits 118, 120 and 122. Solid state circuits 116 through 122 are preferably type 4056 circuits capable of converting a binary coded decimal input into a group of signals which selectively appear on output lines 116f through 116l for driving a seven-segment decimal display unit such as, for example, unit 124 coupled to the aforementioned seven output lines of the driver circuit, such as for example driver circuit 122, in order to selectively illuminate two or more of the display segments 124a through 124g which collectively cooperate to form the decimal digits "0" through "9".

The four binary signals representing the least significant decimal digit are loaded into driver circuit 116 by decoder 112 which decodes the two bit binary control signals E, F applied to inputs 112a, 112b to cause one of its four output lines 112c through 112f to develop a strobe signal, to the exclusion of the remaining three output lines. In the present instance, decoder 112 decodes the control signals E and F causing its output line 112 to develop a strobe pulse for latching the four binary bits representing the least significant decimal digit into latched decoder driver circuit 116. Circuit 116 decodes the four binary inputs and develops signal levels at the outputs 116f through 116l representative of the decimal digit to be displayed, which signals are applied to the display unit, such as unit 124 to display the appropriate decimal digit.

The outputs of control signal generating circuit 104 change at a rate controlled by oscillator 106 causing the next significant decimal digit to be transferred through multiplexer circuits 22 and 24 of card unit 10 to the demultiplexer circuits 92 and 94 of card reader unit 90 thereby causing the binary coded signals representing the next significant decimal digit to appear at outputs 92g and 92h of demultiplexer 92 and 94g and 94h of demultiplexer 94, which signals are applied to respective inputs 118 through 118d of driver circuit 118. The control signals E and F are also applied to decoder 112 causing a strobe signal to be developed at output 112d to transfer and latch the next significant decimal digit into driver circuit 118 for display by its associated display unit 124 (not shown in detail for purposes of simplicity). This operation is continued until all four decimal digits are transferred to the associated driver circuits 116 through 122 and displayed by their associated display units, which are preferably of the liquid crystal display (LCD) type. The data transfer operation is also continuously repeated at the 100 Hz rate.

Clock pulses from source 106 are further simultaneously applied to the control inputs 116m through 122m of driver circuits 116 through 122 and to the input 124a of the display unit 124 for generating the liquid crystal display square wave signal which causes the display unit 24 to operate in an intermittent fashion as is conventional with such units, the pulsing of the display units in array 130 by clock source 106 being at a rate sufficiently rapid to cause the eye of the observer to perceive a "steadily illuminated" decimal digit. The remaining display units of display 124 function in an identical fashion.

The transfer of the count in card reader unit 10 to the driver circuit array 114 is continuously updated since the count in the card unit 10 is being decremented at a rate determined by machine usage. Assuming that the machine controlled by card reader unit 90 is a copier machine, the copier machine is enabled in the following fashion:

The card unit 10 is inserted into the receptacle of the card reader unit 90 which automatically initiates transfer of the count in card unit 10 to the driver circuit array 114. In addition to the count being displayed by the display array 130, logical gating circuitry 132 continuously monitors the driver array 114 to detect for the presence of a zero count condition. A unique condition exists for digit zero since the segment of the display whose illumination is controlled by output 116k will have a voltage on it and the segment whose illumination is controlled by output 116l will have no voltage on it. Outputs 116k, 118k, 120k and 122k are directly connected to diodes D2, D4, D6 and D8 whereas outputs 116l, 118l, 120l and 122l are connected to diodes D3, D5, D7 and D9 by inverter circuits I1 through I4 respectively. Thus, when all digits displayed are decimal zero, a forward base drive is applied to the base electrode of transistor TR1 causing its collector to go to ground and removing base drive from the base electrode of transistor TR2 thereby deenergizing relay S1. Relay contact S1a is then opened thereby developing an open electrical circuit between terminals 134 and 136 which may, for example, be utilized to decouple the machine from its local power source or to provide any other desired disabling function sufficient to prevent further use of the machine when the count in the card unit inserted into the card reader unit has been decremented to zero. The fact that the card reader unit contains a zero count is confirmed by the display array 130.

The copier machine, as is conventional, develops pulses which are applied to pulse inputs 138 and 140 coupled through a full-wave diode bridge 142 to a signal stabilizing circuit 144 comprised of resistors R6 through R8, zener diode ZD1 and capacitors C4 and C5, the output of the signal stabilizing circuit being coupled to count pulse output terminal 146 through inverter I5. Terminal 146 is coupled to terminal 20 of card reader unit 10 when the card unit 10 is inserted into the receptacle of the card reader unit 90. Terminal 150 applies a ground level to the terminal 26 of card unit 10 causing counter 14 to operate as a down counter whereby pulses representative of machine use applied to card unit 10 to cause the count in counter 14 to be decremented.

Although the application set forth hereinabove describes the system of the present invention for use with a copier machine, it should be understood that the system is readily adaptable for use with other machines and/or devices. For example, the system of the present invention may be utilized for dispensing items and materials such as, for example, fuel oil, wherein a fuel tank dispenser is enabled and signals are developed representative of the amount of fluid dispensed to reduce the count in the card unit counter 14. The dispenser may also be a vending machine of the automatic type, wherein the vending machine is provided with processing means for comparing the cost of the selection with the present contents of the card unit wherein the item is dispensed only when the counter contents equals or exeeds the cost of the selected unit. The system may also be employed with point of sale equipment wherein the operator at a register enters the cost of the item selected for purchase and the register is enabled only if the count in the card unit is at least equal to the cost of the selected item, in which case the register creates a record and receipt of the sale and substantially simultaneously therewith reduces the count in the counter unit by an amount equal to the magnitude of the sale. An automatic vending machine may also be operated to vend an item upon receipt of a card unit containing a sufficient count.

For purposes of the present invention, it is sufficient to understand that the control unit serves as the interface for coupling the count in the card unit 10 to display means and possibly to other means for determining the presence of a valid card unit, for example, and for providing an enabling signal when the card reader unit 90 receives a card unit 10 of the proper electrical configuration and containing a non-zero count, these capabilities being designed in a sufficiently universal fashion for use with a wide variety of different machines and/or devices.

The internal wiring arrangement of the card unit 10 relative to its edge connector may be designed so that precise knowledge of the circuit contents of the card unit would be required in order to enable either a card programming unit 30 or a card reader unit 90 thereby providing still further security for the system, in addition to controlling the access to the machine and the extent of said access as a function of the count within the card unit.

Figure 4A:
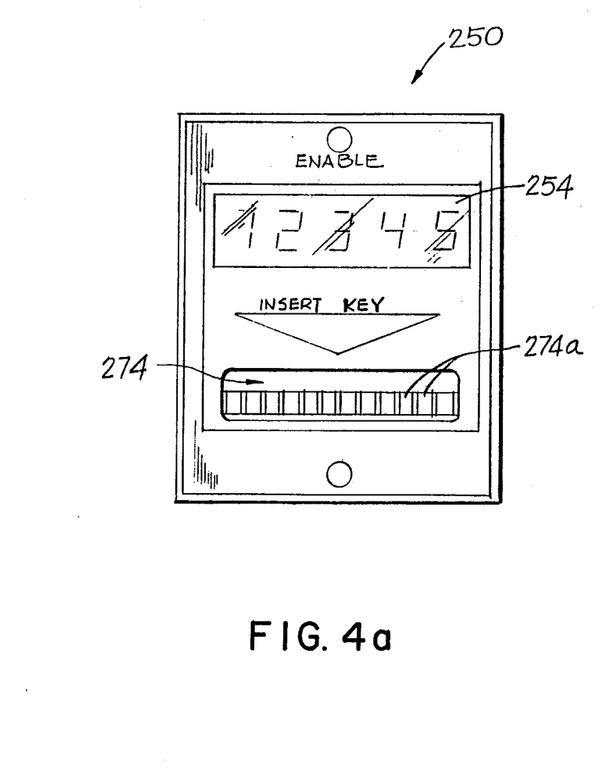
FIG. 4a shows a front view of the card reader unit.
Figure 4B:
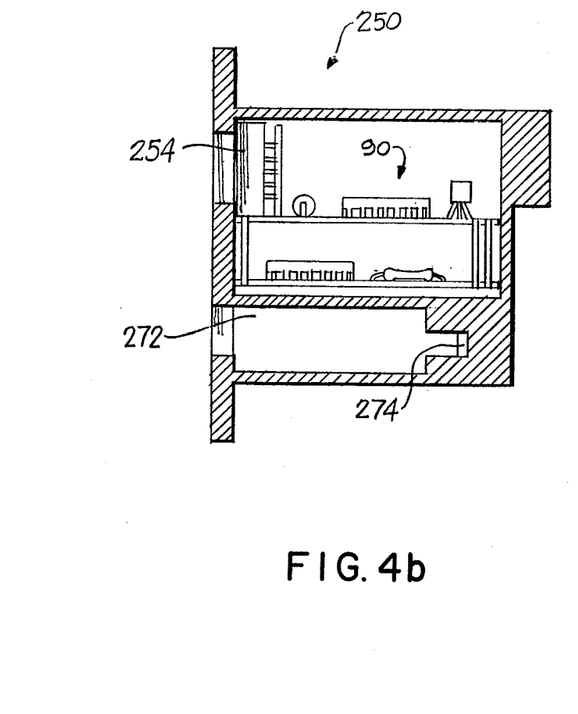

The front of acceptor unit 250 is shown in FIG. 4a while FIG. 4b shows a sectional view of its internal physical arrangement. The acceptor unit 250 is provided with an opening 272 for receiving the key unit 100 whose physical arrangement is shown in FIG. 1a. The rear end of opening 272 is provided with receptacle means 274 in the form of a multi-terminal electrical socket assembly having individual terminals 274a arranged to electrically engage respective ones of the terminals 13a integrally formed within the edge connector assembly 13 of key unit 10.

When key unit 10 is inserted into slot 272 so that its edge connector assembly 13 is properly inserted within multi-terminal socket 274, an electrical circuit is established from the acceptor unit terminals 150 (FIG. 3) to a key unit terminal 51 (FIG. 1) for activating the key unit 10.

In a similar fashion, the outputs of multiplexers 24, 26 of key unit 10 (FIG. 1) each electrically connect with a respective one of the inputs of demultiplexers 92, 94 connected to the multi-socket 274 arranged at the rear of key slot 272.

Although the preferred embodiment described herein is designed to increment the count in a card unit 10 when a count is to be added and to decrement the count when the count is to be removed, the reverse arrangement is also possible. For example, the count in the card unit counter 90 may be exhausted when the count reaches the equivalent of decimal 9999, a count of less than decimal 9999 representing an unexhausted incard unit 10. In such an example, the card unit 10 would be decremented from 9999 to a smaller number under control of the card programming unit and would be incremented from the lower decimal number toward the decimal count 9999, at which time the machine being controlled would then be turned off. By rearranging the wiring of the driver circuits of array 114 the signals may be decoded so that a decimal count of 9999 would be displayed as a decimal count of 0000 thereby adding still further security to the system and rendering a defeat of the system more difficult to unauthorized users who also lack knowledge of the system design.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Control means for preventing unauthorized use of a device and for controlling the extent of such authorized use comprising:
    means operative between a first state for providing a device disabling condition and a second state for providing a device enabling condition;
    a thin, pocket-sized card unit having a miniaturized solid state counter;
    said control means including a card reader unit having means for receiving said card unit;
    electronic display means having a plurality of display portions for displaying a count in a decimal format;
    card unit coupling means for coupling the count in said card unit to said display means;
    said card reader unit further including means for monitoring said device to alter the count contained in said card unit as a function of the usage of said device;
    logical gating means responsive to the count displayed by said display means for operating the control means to its first state when the count displayed is other than a predetermined count and for operating said control device to its second state when the count displayed is said predetermined count.

2. The apparatus of claim 1 wherein said counter in said card unit is an up/down counter of the solid state type.

3. The apparatus of claim 2 wherein said solid state up/down counter is comprised of a plurality of counter stages each adapted to represent a decimal digit in binary coded form.

4. The apparatus of claim 3 wherein said card reader unit comprises means for generating a plurality of binary coded control signals occurring in a predetermined sequence;
    said coupling means further including means responsive to said control signals for transferring the binary coded count signals from each counter state to said card reader unit in a sequential fashion.

5. The apparatus of claim 4 wherein said transfer means transfers each binary coded group representing a decimal digit of said count to an associated decimal display position of said display means responsive to said control signals.

6. The apparatus of claim 4 wherein said card unit includes second coupling means comprising solid state multiplexer means coupled between said solid state counter and said coupling means.

7. The apparatus of claim 5 wherein said card reader unit coupling means comprises solid state demultiplexer means.

8. The apparatus of claim 7 wherein each display position of said display means comprises a solid state decimal display means of the segmented type and latched decoder driver means for storing a binary coded decimal digit transferred thereto.

9. The apparatus of claim 8 wherein each of said latched decoder driver means converts the binary coded decimal signals stored therein to signals for activating the respective segment of the segmented type display coupled thereto to create a visually observable decimal number representative of the binary coded decimal number stored in said latched decoder driver means.

10. The apparatus of claim 9 wherein said logical gating means is coupled to selected ones of said decimal display units of the segmented type for operating said control device to said second state when the decimal quantity displayed is zero.

11. The apparatus of claim 4 wherein said card reader unit coupling means further comprises means responsive to said control signals for strobing only that latched decoder driver means whose binary coded decimal signal has been coupled to the card reader unit transfer means to thereby operate the display coupled to the strobed latched decoder.

12. The apparatus of claim 11 wherein said strobing means comprises solid state binary decoder means for enabling only one of its outputs in accordance with the binary signals applied to its inputs.

13. The apparatus of claim 1 further comprising a miniature battery in said card unit being coupled to said counter means for enabling the contents of the counter means to be stored for an indefinite period.

14. The apparatus of claim 13 wherein said battery is a rechargeable battery arranged to be recharged by the card reader unit when the card unit is coupled to the card reader unit.

15. Means for introducing a preprogrammed count into a card unit, said card unit comprising a solid state counter means;
said count programming unit comprising settable switch means;
a receptacle for receiving a card unit;
programming unit counter means and means responsive to insertion of a card unit into said receptacle for transferring the count represented by said settable switch means into said programming unit counter means and for simultaneously altering the count in said programming unit counter means and said card unit counter means in reverse directions under the control of clock pulse means; and
means for deenergizing said clock pulse means when said card programming unit count means reaching a predetermined count.

16. The apparatus of claim 15 wherein said card programming unit further includes display means for displaying the count of the card unit counter means in a decimal fashion.

17. The apparatus of claim 14 wherein said card programming unit further comprises a power source terminal and a power return terminal;
said card unit comprising jumper means for coupling said power source terminal to said power return terminal when the card unit is inserted into said receptacle means;
first normally reset bistable means being operated to the set state upon insertion of a card unit into said receptacle means;
second normally reset bistable means being set when said first bistable means is set and a switch means coupled therebetween is closed to enable transfer of the decimal number set in said settable switch means into said programming unit counter means.

18. The apparatus of claim 16 further comprising gating means responsive to insertion of the desired count to be entered into said card unit counter means for simultaneously passing clock pulses from said clock pulse means to the counter means of said card unit and said programming unit.

19. The apparatus of claim 18 further comprising means in said card programming unit for operating the card unit counter means, which is an up/down counter, to count in a predetermined direction when the card unit is inserted into the receptacle means of the card programming unit.

20. The apparatus of claim 15 further comprising logical gating means responsive to said card programming unit counter means reaching a predetermined count for preventing said clock pulse means from passing further pulses to the counter means of said card unit and said programming unit.

21. The apparatus of claim 17 further comprising means coupling the output of said logical gating means to said first and second bistable means to simultaneously reset said first and second bistable means when the programming unit counter means reaches a predetermined count to clear the card programming unit counter, disable said clock source and prevent said card input from being programmed again due to accidental operation of said programming switch.

22. The apparatus of claim 15 further comprising visual display means for displaying a decimal number representing the count transferred from said card programming unit to said card unit.

23. The apparatus of claim 15 wherein said card unit further comprises a miniature battery means for enabling storage of a count in said card unit counter means for an indefinite period of time.

24. The apparatus of claim 23 wherein said battery is rechargeable and said card programming unit further comprises means for charging said rechargeable battery when said card unit is inserted into said receptacle means.

25. A method for controlling access and extent of access of machine and employing a card unit, card programming unit and card reading unit, said card unit comprising solid state counter means, said card programming unit comprising means for introducing a preprogrammed count into said card unit and said card reader unit including means for displaying said count, means for decrementing said count responsive to machine use and means for controlling the state of the machine in accordance with the count stored in the card unit, comprising the steps of:
setting a predetermined count in said programming unit;
inserting a card unit into said programming unit;
simultaneously decrementing the count in the programming unit and incrementing the count in said card unit counter means in accordance with a preselected quantity and displaying the count in said card unit to confirm the accumulation of the desired count in the card unit;
halting incrementing of the count in the card unit counter when the count in the programming unit counter reaches a predetermined count;
removing the card unit from the programming unit and inserting the preprogrammed card unit into the card reader unit to couple the counter in the card unit to the display in the card reader unit;
enabling the machine coupled to said card reader unit only when the count in the card unit counter is other than a predetermined quantity;
generating a visual display of the count in the card unit counter;
altering the count in said card unit counter means as the machine is being used, said count being decremented by an amount commensurate with the use of said machine;
updating the visual display to reflect changes in said count; and
disabling said machine when said count reaches said predetermined quantity.

26. The method of claim 25 further comprising the steps of transferring in binary form each decimal digit of the count from said card unit to said card reader unit in a predetermined sequence and continually repeating said sequence.

* * * * *

UNITED STATES PATENT AND TRADEMARK OFFICE
CERTIFICATE OF CORRECTION

PATENT NO. : 4,458,142
DATED : July 3, 1984
INVENTOR(S) : Marvin Bernstein

It is certified that error appears in the above-identified patent and that said Letters Patent is hereby corrected as shown below:

Column 9, line 26 change "124" to --124"--.

In the claims:

Claim 25, column 14, line 49 change first "the" to --said--.

Signed and Sealed this

Fourth Day of December 1984

[SEAL]

Attest:

GERALD J. MOSSINGHOFF

Attesting Officer　　Commissioner of Patents and Trademarks